United States Patent
Shinzato et al.

(10) Patent No.: US 9,065,306 B2
(45) Date of Patent: Jun. 23, 2015

(54) OXIDE SUPERCONDUCTING COIL, OXIDE-SUPERCONDUCTING-COIL ASSEMBLY, AND ROTATING MACHINE

(75) Inventors: Tsuyoshi Shinzato, Osaka (JP); Hitoshi Oyama, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 424 days.

(21) Appl. No.: 13/257,388

(22) PCT Filed: Aug. 3, 2010

(86) PCT No.: PCT/JP2010/063050
§ 371 (c)(1),
(2), (4) Date: Sep. 19, 2011

(87) PCT Pub. No.: WO2011/048859
PCT Pub. Date: Apr. 28, 2011

(65) Prior Publication Data
US 2012/0028807 A1 Feb. 2, 2012

(30) Foreign Application Priority Data
Oct. 20, 2009 (JP) .................. 2009-241455

(51) Int. Cl.
*H01B 12/00* (2006.01)
*H02K 3/04* (2006.01)
(Continued)

(52) U.S. Cl.
CPC .. *H02K 3/04* (2013.01); *H01F 6/06* (2013.01); *H02K 55/04* (2013.01); *Y02E 40/625* (2013.01)

(58) Field of Classification Search
CPC .................. H01F 6/06; H02K 55/04

USPC ......................................... 505/211
IPC .................. H01F 6/06; H02K 55/04
See application file for complete search history.

(56) References Cited

U.S. PATENT DOCUMENTS

| 4,554,731 A | 11/1985 | Borden |
| 5,606,300 A * | 2/1997 | Koyama et al. ............... 335/216 |

(Continued)

FOREIGN PATENT DOCUMENTS

| CN | 1371519 A | 9/2002 |
| CN | 101164124 A | 4/2008 |

(Continued)

OTHER PUBLICATIONS

Machine translation of JP 2009-049040 (2009).*

*Primary Examiner* — Paul Wartalowicz
(74) *Attorney, Agent, or Firm* — Drinker Biddle & Reath LLP

(57) ABSTRACT

The invention offers a superconducting coil, which is an oxide superconducting coil 10 that has the shape of a saddle formed by winding an oxide superconducting wire 11 in the shape of a racetrack and that has a curved portion 10b and a linear portion 10a connected to the curved portion 10b. At least in the central portion of the linear portion 10a, an upper end 10d is positioned at the inner-circumference side in comparison with a lower end 10e. Having the foregoing configuration, the superconducting coil formed of an oxide superconducting wire can suppress the reduction in its electrical property caused by the lines of magnetic flux when used in a rotating machine such as a motor. The invention also offers a superconducting-coil assembly formed by using the foregoing superconducting coils and a rotating machine incorporating the foregoing superconducting coil (superconducting-coil assembly).

7 Claims, 12 Drawing Sheets

(51) Int. Cl.
*H01F 6/06* (2006.01)
*H02K 55/04* (2006.01)

(56) References Cited

U.S. PATENT DOCUMENTS

2002/0149453 A1* 10/2002 Snitchler et al. ............ 335/182
2009/0058592 A1* 3/2009 Leghissa et al. ............ 336/225

FOREIGN PATENT DOCUMENTS

| | | |
|---|---|---|
| JP | 52-139955 | 11/1977 |
| JP | 1-176905 | 12/1989 |
| JP | 4-264704 | 9/1992 |
| JP | 2002-110416 | 4/2002 |
| JP | 2006-332577 | 12/2006 |
| JP | 2009-49040 | 3/2009 |

* cited by examiner (A)

(B)

(A)

(B)

(C)

$(\theta_1 > \theta_2 > \theta_3)$

OXIDE SUPERCONDUCTING COIL, OXIDE-SUPERCONDUCTING-COIL ASSEMBLY, AND ROTATING MACHINE

TECHNICAL FIELD

The present invention relates to an oxide superconducting coil, an oxide-superconducting-coil assembly, and a rotating machine, more specifically to a saddle-shaped oxide superconducting coil, an oxide-superconducting-coil assembly formed by using the foregoing oxide superconducting coil, and a rotating machine incorporating the foregoing oxide-superconducting-coil assembly.

BACKGROUND ART

A superconducting coil has been disclosed that is formed by winding a superconducting wire, which is a tape-shaped superconductor (for example, the published Japanese patent application Tokukai 2002-110416 (Patent literature 1)). Patent literature 1 has disclosed a connection method in a superconducting coil as follows: at the time a metal electrode is metallurgically connected to connecting portions of superconducting-coil elements each having a large number of turns, under the condition that the metal electrode is brought into contact with the connecting portions while compression force is being applied to the metal electrode in the direction toward the winging by using a connecting jig, the connecting portions connect with each other metallurgically.

SUMMARY OF INVENTION

Technical Problem

According to Patent literature 1 described above, a plurality of pancake-shaped superconducting coils, which are each formed by spirally winding a superconducting wire, are stacked to be mutually connected. In the above description, the term "stacked" means that a plurality of superconducting coils are stacked on top of each other in layers in the direction perpendicular to the surface formed by the ends of the width of the superconducting wire wound in the shape of a pancake (the surface is formed by the assembling of the individual regions of the wound superconducting wire, and hereinafter the surface is referred to as "ends-formed surface").

The following case is taken as an example. In this case, a motor, which is a type of rotating machine, incorporates pancake-shaped superconducting coils stacked as described in Patent literature 1. The superconducting coil is wound such that it surrounds the region known as a tooth of the rotor and stator, which form the motor. When the superconducting coil is wound around the tooth and a current is supplied to the superconducting coil, the tooth acts as an electromagnet. In this case, when the current flowing in the superconducting coil is AC current, the polarity of the electromagnet formed of the tooth varies with time. In consequence, the tooth of the rotor and the tooth of the stator repulse each other or attract each other. This phenomenon rotates the rotor and thereby enables the motor to function.

When a current flows in the superconducting coil, a magnetic field is generated around the superconducting coil. Then, lines of magnetic flux pass around the superconducting coil. Most of the lines of magnetic flux pass around along a route relatively away from the superconducting coil. Consequently, they pass through the inside of the tooth. Part of the lines of magnetic flux, however, pass around along a route inside the foregoing route. Consequently, they pass through the inside of the superconducting coil. Specifically, the lines of magnetic flux passing through the inside of the superconducting coil include lines of magnetic flux passing through it in a direction crossing the width and longitudinal axis of the coil, particularly in a direction along the thickness of the superconducting wire forming the superconducting coil (more specifically, in a direction passing through the main surface of the superconducting wire). It is known that the lines of magnetic flux passing through the main surface of the superconducting wire deteriorate the electric-current property of the superconducting coil and thereby cause phenomena such as quenching in the superconducting coil. In the above description, the term "main surface of the superconducting wire" means the principal surface formed by the width and length of the superconducting wire.

Of the superconducting wires, particularly the wire known as the oxide superconducting wire, such as the wire in which a superconductor formed of an oxide is covered with a silver or other metal sheath, can be used in an environment at higher temperature in comparison with a metallic superconducting wire formed by using a superconductor composed of the conventionally used metal. In other words, when the oxide superconducting wire is used, the equipment for cooling the superconducting wire can be simplified in comparison with the case where the metallic superconducting wire is used. Consequently, in recent years, engineers and researchers have been particularly advancing the practical application of the oxide superconducting wire. Patent literature 1 described above does not disclose which wire, the metallic superconducting wire or the oxide superconducting wire, is used for producing the disclosed superconducting coil. Nevertheless, without regard to whichever wire is used to produce the disclosed superconducting coil, the metallic superconducting wire or the oxide superconducting wire, when the superconducting coil is configured such that the main surface of the coil is nearly in parallel with the axis at the center of the hollow portion of the superconducting coil, part of the lines of magnetic flux generated by the current flowing in the superconducting coil used in the rotor and stator of the motor pass through the main surface of the superconducting wire. In consequence, even when the motor incorporates a superconducting coil formed of the oxide superconducting wire, which can be used in a high-temperature environment, because of the generation of the above-described lines of magnetic flux, the current property of the superconducting coil may deteriorate and thereby cause the reduction in the electrical efficiency of the entire equipment.

In view of the above-described problem, the present invention is made. An object of the present invention is to offer a superconducting coil that is formed of an oxide superconducting wire and that can suppress the reduction in the electrical property owing to the influence of the lines of magnetic flux when used in a rotating machine such as a motor. Another object is to offer a superconducting-coil assembly formed by using the foregoing superconducting coil and a rotating machine incorporating the foregoing superconducting coil (or superconducting-coil assembly).

Solution to Problem

An oxide superconducting coil of the present invention is an oxide superconducting coil having the shape of a saddle formed by winding an oxide superconducting wire in the shape of a racetrack. The oxide superconducting coil has a curved portion and a linear portion connected to the curved portion. At least in the central portion of the linear portion, the coil's upper end is positioned at the inner-circumference side of the coil in comparison with the coil's lower end.

In the above description, the term "shape of a saddle" means a shape in which as described below, in a superconducting coil formed by winding a superconducting wire in the shape of a racetrack, the upper end of the wire is bent upward in a part of the coil's end portion in the direction of the length (the coil's end portion). The upper end is one end of the width of the oxide superconducting wire wound in the shape of a racetrack and is positioned at the upper side when the oxide superconducting coil is in place. In other words, the upper end is the end where the wire forms a convex shape by being bent at the coil's end portion. The ends-formed surface formed by the assembled upper ends of the wound wire is the upper-ends-formed surface having the convex shape when viewed from side. Similarly, the lower end is the other end of the width of the oxide superconducting wire wound in the shape of a racetrack (that is, the lower end is positioned at the opposite side of the upper end) and is positioned at the lower side when the oxide superconducting coil is in place. In other words, the lower end is the end where the wire forms a concave shape by being bent at the coil's end portion. The ends-formed surface formed by the assembled lower ends of the wound wire is the lower-ends-formed surface having the concave shape when viewed from side.

In the oxide superconducting coil formed in the shape of a racetrack as described above, the region where the oxide superconducting wire linearly extends is referred to as a linear portion. At least in the central portion of the linear portion, the wire is wound such that the upper end is positioned at the inner-circumference side in comparison with the lower end. In other words, in the central portion, the oxide superconducting coil is configured such that the main surface of the oxide superconducting wire forming the oxide superconducting coil forms an acute angle with the axis at the center of the hollow portion of the oxide superconducting coil. When this configuration is employed, the line of magnetic flux generated by the current flowing in the oxide superconducting wire proceeds in the direction along the main surface of the oxide superconducting wire. In other words, the percentage of the line of magnetic flux proceeding in a direction passing through the main surface of the oxide superconducting wire is decreased. This decrease can suppress the deterioration of the current property of the coil formed by the oxide superconducting wire. It is desirable that the center portion, where the upper end is positioned at the inner-circumference side in comparison with the lower end, have a length at least half the entire length of the linear portion, more desirably at least 60% of the entire length of the linear portion.

In the above-described oxide superconducting coil, it is desirable that in the curved portion, the upper end be positioned at the inner-circumference side in comparison with the lower end. The term "curved portion" means the above-described coil's end portion. In other words, the term "curved portion" means the region to which each of both ends of the linear portion of the oxide superconducting coil having the shape of a racetrack extends and the region that bends so that the main surface of the oxide superconducting wire can have the shape of a racetrack. As with the linear portion, when the curved portion has a configuration in which the upper end is positioned at the inner-circumference side in comparison with the lower end, in the curved portion, also, the line of magnetic flux generated by the current flowing in the oxide superconducting wire proceeds in the direction along the main surface of the oxide superconducting wire. In other words, the percentage of the line of magnetic flux proceeding in a direction passing through the main surface of the oxide superconducting wire is decreased. This decrease can more reliably suppress the deterioration of the current property of the coil formed by the oxide superconducting wire.

In the foregoing oxide superconducting coil, in a part of the region of a boundary portion sandwiched between the linear portion and the curved portion, it is desirable that the upper end be positioned at the outer-circumference side in comparison with the lower end. The oxide superconducting wire has the following structure, for example. In one example, first, a material powder of an oxide superconductor such as bismuth is prepared. The powder is covered with a sheath portion made of silver or the like to form a tape-shaped member. The member is sintered to complete the structure. In another example, first, for example, an yttrium-based sintered body having the shape of a thin film is prepared which is an oxide superconducting wire. A silver-sputtered layer and the like are laminated on the sintered body to complete the structure. Having the above-described structure, the oxide superconducting wire may easily suffer damage such as breakage depending on the degree of the deformation or bending. Consequently, it is difficult to form the superconducting coil so that over the entire circumference of the oxide superconducting wire wound in the shape of a racetrack, the upper end can be positioned at the inner-circumference side in comparison with the lower end as described above. To surmount the difficulty, in a part of the region of the boundary portion sandwiched between the linear portion and the curved portion, the upper end is positioned at the outer-circumference side in comparison with the lower end, which is a configuration reversed from the configuration in the other regions. As described above, the providing of a region in which the main surface is inclined in a direction reversed from the direction in the other regions enables the winding of the oxide superconducting wire in such a manner that the upper end is positioned at the inner-circumference side in comparison with the lower end in the linear and curved portions. This configuration can control the strain produced by the stress developed in the oxide superconducting wire. In other words, when the above-described configuration is employed, in the oxide superconducting wire wound such that its main surface is not in parallel with the axis at the center of the hollow portion of the oxide superconducting coil in the linear and curved portions, the damage and the like caused by the internal stress can be suppressed from occurring. Even when the upper end is positioned at the outer-circumference side in comparison with the lower end in a part of the boundary portion, the electrical property of the coil suffers little influence of the line of magnetic flux generated by the oxide superconducting coil. As a result, a good condition of the electrical property of the coil can be secured.

The oxide superconducting coil of the present invention may be applied to a configuration in which a single oxide superconducting coil is applied, for example, to one tooth of a motor. On the other hand, the coil can be used to form an oxide superconducting-coil assembly, which is formed by stacking a plurality of oxide superconducting coils such that the lower end of an oxide superconducting coil faces the upper end of another oxide superconducting coil. In this case, also, as described above, in particular, when the individual portions, such as the linear portion and the curved portion, of the individual oxide superconducting coils satisfy the above-described positional relationship between the upper end and the lower end, the current property of the oxide superconducting coil can be suppressed from deteriorating.

In the above-described superconducting-coil assembly, it is desirable that the oxide superconducting wire in each of the oxide superconducting coils has a main surface that is inclined toward the direction in which the multiple oxide superconducting coils are stacked, with the angle of inclination being different from one oxide superconducting coil to another. Lines of magnetic flux generated by the current flowing in the oxide superconducting-coil assembly are formed such that they basically encircle the oxide superconducting wires of the oxide superconducting coils. Consequently, the direction and angle of the lines of magnetic flux vary depending on the region outside the oxide superconducting wire. Accordingly, by changing the angle (the angle of inclination) at which the main surface of the oxide superconducting wire of the oxide superconducting coil placed in an individual region is inclined toward the axis at the center of the hollow portion of the oxide superconducting coil in accordance with the variation in the direction and angle of the line of magnetic flux, the stacked individual superconducting coils can suppress the deterioration of the current property resulting from the passing of the line of magnetic flux through the main surface of the oxide superconducting wire. The same effect as described above can also be achieved on a rotating machine, such as a motor, incorporating the oxide superconducting-coil assembly described above.

In the above description, the expression "changing the angle of inclination" means that the above-described angle of inclination of one of the stacked multiple oxide superconducting coils is different from that of at least one of the others. For example, when three or more oxide superconducting coils are stacked, the above-described situation includes the case where the angle of inclination of only one coil is different from that of the other coils (in other words, of the stacked multiple oxide superconducting coils, whereas a plurality of coils have the same angle of inclination, another coil has a different angle of inclination). The foregoing situation also includes the case where the angles of inclination of all of the oxide superconducting coils are different from one another.

Advantageous Effects of Invention

The present invention can offer a saddle-shaped oxide superconducting coil that can suppress the deterioration of the current property when used, for example, in a rotating machine and an oxide-superconducting-coil assembly formed by stacking the multiple oxide superconducting coils described above. The present invention can also offer a rotating machine that can suppress the deterioration of the current property by incorporating the foregoing oxide superconducting coil or the foregoing oxide-superconducting-coil assembly.

BRIEF DESCRIPTION OF DRAWINGS

FIG. 2 is a schematic diagram showing the upper end and lower end of the superconducting coil in Embodiment 1 of the present invention.

FIG. 3 is a schematic cross-sectional view when viewed from the line III-III in FIG. 2.

FIG. 4 is a schematic cross-sectional view when viewed from the line IV-IV in FIG. 2.

FIG. 5 is a schematic cross-sectional view when viewed from the line V-V in FIG. 2.

FIG. 7 is a perspective view schematically showing the bismuth-based superconducting wire in Embodiment 1 of the present invention.

FIG. 8 is a perspective view schematically showing the thin-film superconducting wire in Embodiment 1 of the present invention.

FIG. 9 is a schematic cross-sectional view showing the direction of the lines of magnetic flux generated by the current flowing in the linear portion of the superconducting coil in Embodiment 1 of the present invention.

FIG. 10 is a top view schematically showing a device for producing the superconducting coil in Embodiment 1 of the present invention.

FIG. 11 is a schematic cross-sectional view when viewed from the line XI-XI in FIG. 10.

FIG. 12 is a schematic cross-sectional view when viewed from the line XII-XII in FIG. 10

FIG. 13 is a schematic cross-sectional view when viewed from the line XIII-XIII in FIG. 10

FIG. 14 is a perspective view schematically showing the superconducting-coil assembly in Embodiment 2 of the present invention.

FIG. 15 is a schematic cross-sectional view when viewed from the line XV-XV in FIG. 14

FIG. 17 is a cross-sectional view schematically showing a motor incorporating the superconducting coil in this embodiment.

FIG. 18 is a perspective view schematically showing the rotor that is shown in FIG. 17 and that incorporates the superconducting coil.

FIG. 19 is a perspective view schematically showing the stator that is shown in FIG. 17 and that incorporates the superconducting coil.

FIG. 20 is an enlarged schematic diagram showing the region enclosed by the broken line XX in FIG. 17.

FIG. 21 is an enlarged schematic diagram showing the region enclosed by the broken line XXI in FIG. 17.

DESCRIPTION OF EMBODIMENTS

Figure 1:
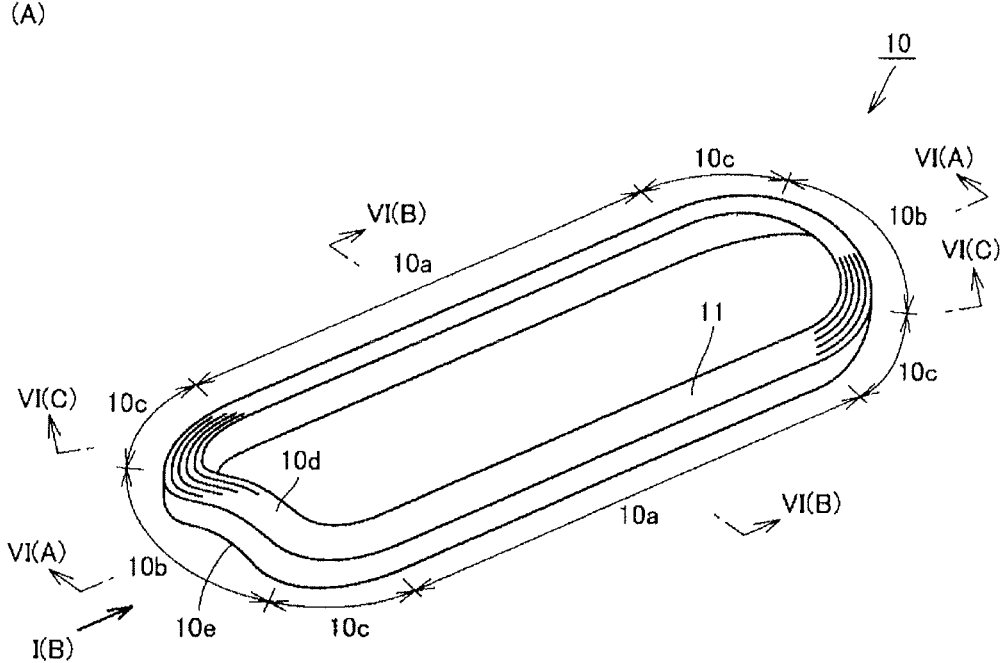
[FIG. 1] FIG. 1's (A) portion is a perspective view schematically showing the superconducting coil in Embodiment 1 of the present invention, and FIG. 1's (B) portion is a side view when viewed from the arrow I (B) shown in FIG. 1's (A) portion.
Figure 1:
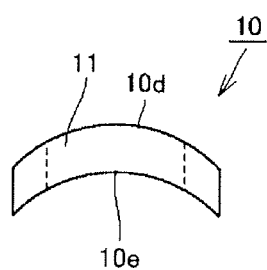

Embodiments of the present invention are explained below by referring to the drawing. In Embodiments, components performing the same function bear the same reference signs and explanations are not repeated unless it is necessary. In the drawing, the ratios of the dimensions are not necessarily coincident with those of the explanation.

Embodiment 1

A superconducting coil 10 in an embodiment of the present invention is explained below by referring to FIGS. 1 to 10. As shown in FIG. 1's (A) and (B) portions and FIG. 2, the superconducting coil 10 in this embodiment is a saddle-shaped superconducting coil formed by winding a superconducting wire 11 in the shape of a racetrack. In other words, when viewed from above, the superconducting coil 10 has the shape of a racetrack.

The superconducting coil 10 has linear portions 10a, curved portions 10b, and boundary portions 10c. The linear portions 10a are each a linear portion extending longitudinally. The curved portions 10b are each a portion having the shape of a curve when viewed from above (the coil's end portion). The boundary portions 10c are each sandwiched between the linear portion 10a and the curved portion 10b and are regions each connecting the linear portion 10a with the curved portion 10b.

As shown in FIG. 1's (B) portion, the curved portion 10b has the shape of a saddle, in which a lower end 10e, which forms the bottom surface, is curved in the shape of an arc. The lower end 10e is one end of the width of the wound superconducting wire 11; that is, the end at the lower side shown in FIG. 1's (B) portion. The ends-formed surface formed by the assembling of the lower ends 10e is referred to as "the lower-ends-formed surface." The upper end 10d is the other end of the width of the wound superconducting wire 11; that is, the end at the upper side shown in FIG. 1's (B) portion. The ends-formed surface formed by the assembling of the upper ends 10d is referred to as "the upper-ends-formed surface." The superconducting coil 10 shown in FIG. 1's (A) portion has the shape of a saddle formed by winding the superconducting wire such that in a part of the region of the curved portion 10b, the upper end 10d has a convex shape (that is, the lower end 10e has a concave shape). In other words, in a part of the region of the curved portion 10b, the entire superconducting wire 11 is bent upward so that both the upper end 10d and the lower end 10e can bend upward.

Figure 2:
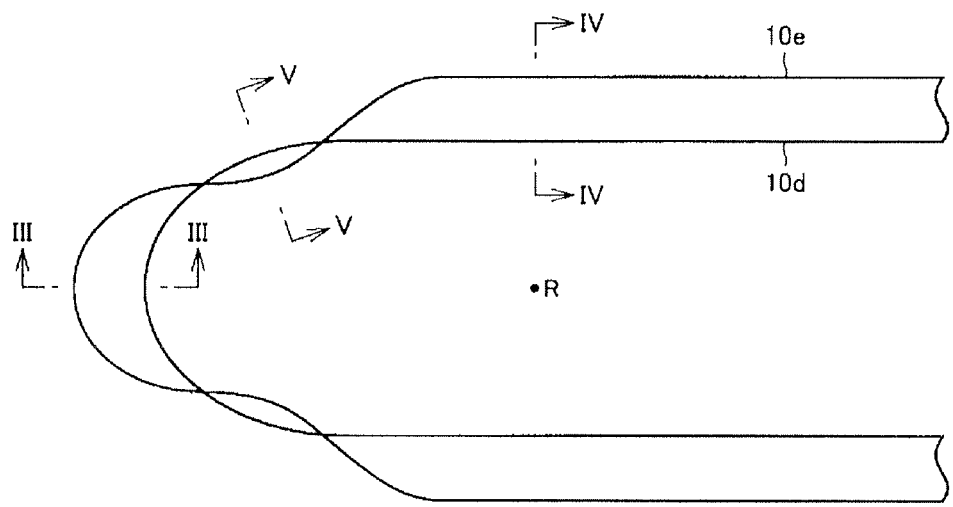
[FIG. 2]

FIG. 2 shows the position of the upper end 10d and the lower end 10e of one superconducting wire 11 included in the superconducting coil 10, when viewed from above, with the other superconducting wires 11 and the like being omitted. In FIG. 2, the center R shows the center of the arc formed by the superconducting wire at the curved portion 10b.

Figure 3:
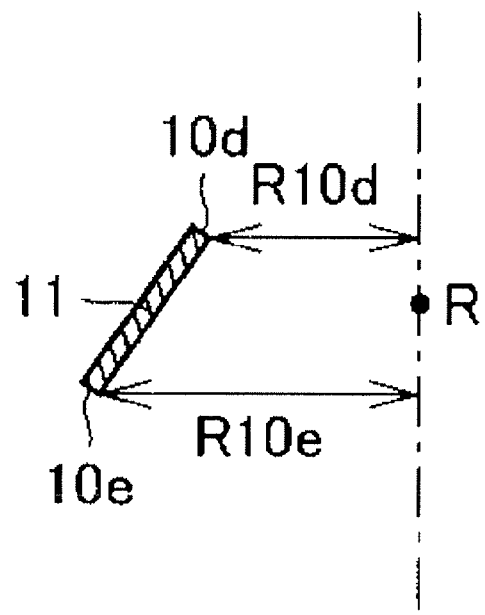
[FIG. 3]

As can be seen from FIGS. 2 and 3, in the curved portion 10b, the upper end 10d is positioned at the inner-circumference side (the side of the hollow portion formed by the enclosing superconducting coil 10) in comparison with the lower end 10e. More specifically, in the curved portion 10b, the distance R10d between the upper end 10d and the center R is smaller than the distance R10e between the lower end 10e and the center R.

Figure 4:
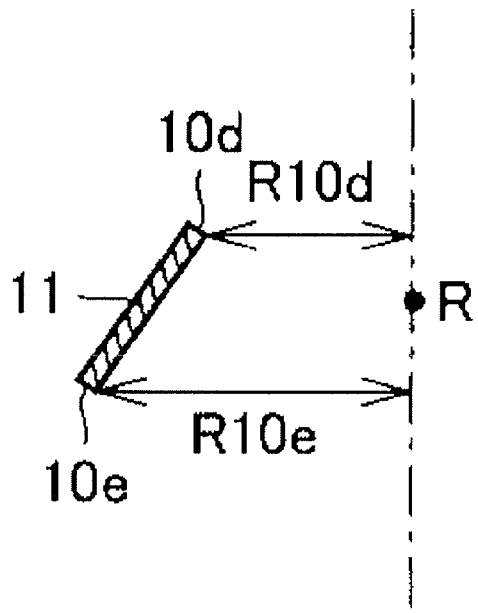
[FIG. 4]

As can be seen from FIGS. 2 and 4, in the linear portion 10a, also, the upper end 10d is positioned at the inner-circumference side (the side of the hollow portion formed by the enclosing superconducting coil 10) in comparison with the lower end 10e. More specifically, in the linear portion 10a, the distance R10d between the upper end 10d and the center R is smaller than the distance R10e between the lower end 10e and the center R.

Figure 5:
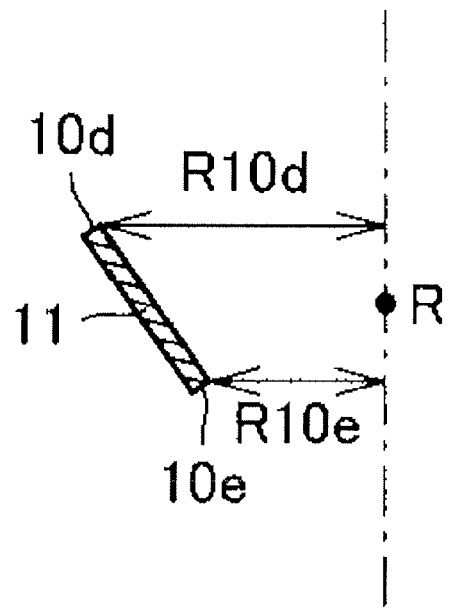
[FIG. 5]

As can be seen from FIGS. 2 and 5, in the boundary portion 10c, the upper end 10d is positioned at the outer-circumference side (the side opposite to the side of the hollow portion formed by the enclosing superconducting coil 10) in comparison with the lower end 10e. More specifically, in the boundary portion 10c, the distance R10d between the upper end 10d and the center R is larger than the distance R10e between the lower end 10e and the center R.

As shown in FIG. 2, the positions of the upper end 10d and the lower end 10e are reversed with respect to the distance to the center R, for example, in a part of the region of the boundary portion 10c. Consequently, in the boundary portion 10c shown in FIG. 2, at the location where the upper end 10d intersects with the lower end 10e, there is a location where the position of the upper end 10d coincides with that of the lower end 10e in a direction crossing the circumference. In other words, the plane formed by the upper end 10d and the lower end 10e at this location is in parallel with the axis passing through the center R. At this location, the distance R10d between the upper end 10d and the center R is the same as the distance R10e between the lower end 10e and the center R. This location may exist in the boundary portion 10c or in the linear portion 10a or in the curved portion 10b.

It is desirable that the upper end 10d have the same length as that of the lower end 10e. When this design is employed, in the curved portion 10b and the boundary portion 10c, the superconducting wire 11 is configured such that its inclination varies gradually.

Figure 6:
[FIG. 6] FIG. 6's (A) portion is a schematic cross-sectional view when viewed from the line VI (A)-VI (A) in FIG. 1, FIG. 6's (B) portion is a schematic cross-sectional view when viewed from the line VI (B)-VI (B) in FIG. 1, and FIG. 6's (C) portion is a schematic cross-sectional view when viewed from the line VI (C)-VI (C) in FIG. 1.
Figure 6:
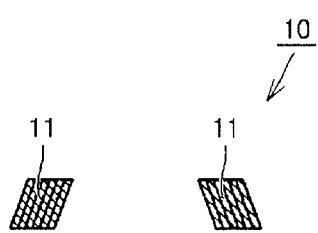
Figure 6:

When the superconducting wire 11 is configured as described above, as shown in FIG. 6's (A) and (B) portions, the direction of the inclination of the superconducting wire 11 in the curved portion 10b of the superconducting coil 10 is the same as that in the linear portion 10a. As shown in FIG. 6's (C) portion, however, the direction of the inclination of the superconducting wire 11 in the boundary portion 10c of the superconducting coil 10 is opposite to that in the curved portion 10b and the linear portion 10a.

In the superconducting coil 10 shown in FIG. 1's (A), nearly the entire portion of the linear portion 10a is configured as shown in the cross-sectional view in FIG. 6's (B) portion, where the upper end 10d is positioned at the inner-circumference side in comparison with the lower end 10e. It is desirable that the upper end 10d be positioned at the inner-circumference side in comparison with the lower end 10e, as described above, at least in the central portion of the linear portion 10a of the superconducting coil 10 (for example, 60% or more of the entire length of the linear portion 10a). Nevertheless, in the region outside the central portion (the region lying on the extension of the central portion), a region may exist in which, for example, the main surface of the superconducting wire 11 formed by the upper end 10d and the lower end 10e is in parallel with the axis passing through the center of the hollow portion of the superconducting coil 10. In other words, in the region outside the central portion (the region lying on the extension of the central portion), a location may exist in which, for example, the position of the upper end 10d coincides with that of the lower end 10e in the direction perpendicular to the circumference.

The above description can also be applied to the curved portion 10b. The entire curved portion 10b may have a configuration as shown in the cross-sectional view shown in FIG. 6's (A) portion, where the upper end 10d is positioned at the inner-circumference side in comparison with the lower end 10e. Nevertheless, a part of the region in the curved portion 10b may have a configuration in which the upper end 10d is positioned at the inner-circumference side in comparison with the lower end 10e. Furthermore, in a part of the region in the curved portion 10b, a location may exist in which the position of the upper end 10d coincides with that of the lower end 10e in a direction crossing the circumference.

The above-described terms "the upper end 10d" and "the lower end 10e" are given under the condition that the superconducting coil 10 is placed on a flat plane as shown in FIG. 1's (A). Consequently, when the superconducting coil 10 is placed under the condition reversed from the condition shown in FIG. 1's (A) (when placed such that the upper end 10d is positioned at the lower side and the lower end 10e is positioned at the upper side), in the curved portion, the upper side is positioned at the outer-circumference side in comparison with the lower side, and in the linear portion, also, the upper side is positioned at the outer-circumference side in comparison with the lower side. Despite the above description, in the following description, the upper side in FIG. 1's (A) portion is referred to as the upper end 10d and the lower side, as the lower end 10e.

An explanation is given below about the superconducting wire 11 forming the superconducting coil 10. The superconducting wire 11 is the so-called oxide superconducting wire. More specifically, the wire may be obtained, for example, by the following process: first, a material powder of an oxide superconductor such as bismuth is covered with a sheath portion made of silver or the like to form a tape-shaped member, and then the member is sintered to complete the process. Alternatively, a structure may be employed which is formed by the following process: first, a nickel-based substrate is prepared that has the shape of a long plate (the shape of a strip); second, on the substrate, for example, an yttrium-based oxide superconductor, which forms a superconducting wire, is formed so as to have the shape of a thin film; and third, on the superconductor, a silver-spattered layer and the like are laminated to complete the process.

Figure 7:
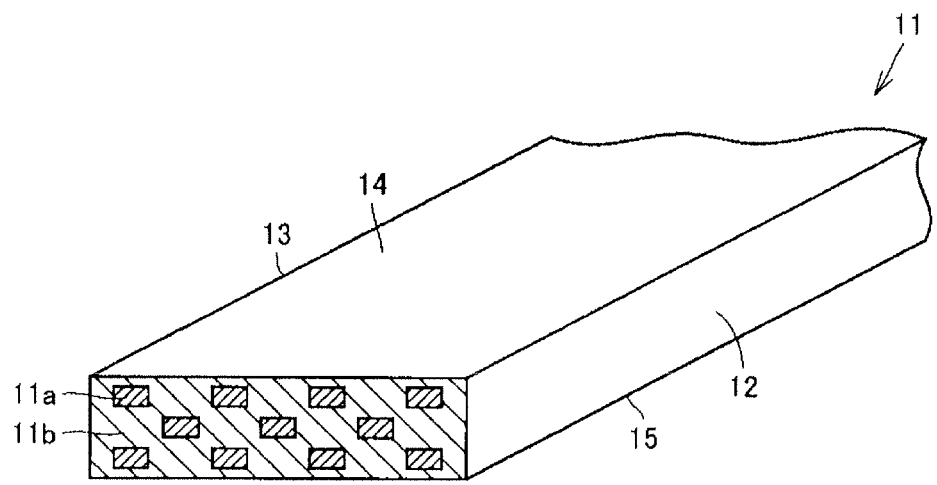
[FIG. 7]

As shown in FIG. 7, a bismuth-based superconducting wire has a plurality of superconductors 11a extending longitudinally and a sheath portion 11b covering the entire circumferences of the multiple superconductors 11a. The sheath portion 11b is in contact with the superconductors 11a. It is desirable that each of the multiple superconductors 11a be a bismuth-based superconductor having a Bi—Pb—Sr—Ca—Cu—O-based composition, for example. In particular, it is most suitable to use a material including a Bi-2223 phase whose numerals approximately indicate the atomic ratio of (bismuth (Bi) and lead (Pb)):strontium (Sr):calcium (Ca):copper (Cu), which is about 2:2:2:3. The sheath portion 11b is made of, for example, silver or silver alloy. The multiple superconductors 11a may be replaced with a single superconductor.

Figure 8:
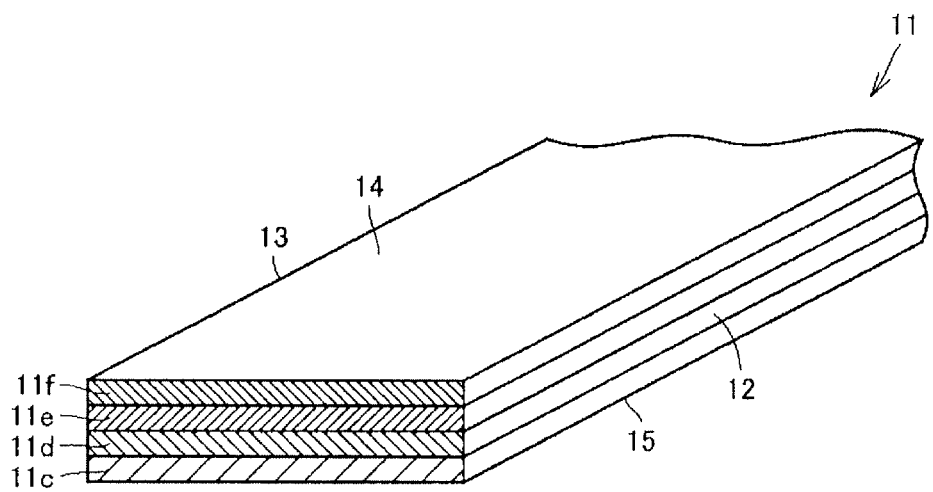
[FIG. 8]

As shown in FIG. 8, a thin-film superconducting wire has a substrate 11c, an intermediate layer 11d placed directly on the substrate 11c, a superconducting layer 11e placed directly on the intermediate layer 11d, and a stabilizing layer 11f placed directly on the superconducting layer 11e.

The substrate 11c is composed of metal such as stainless steel, nickel alloy (for example, Hastelloy), or silver alloy. The intermediate layer 11d is composed of; for example, yttria-stabilized zirconia, cerium oxide, magnesium oxide, or strontium titanate. The intermediate layer 11d may be omitted.

The superconducting layer 11e is composed of, for example, an RE123-based superconductor. The term "RE123-based superconductor" means that in $RE_xBa_yCu_zO_{7-d}$, "x" is 0.7 or more and 1.3 or less, "y" is 1.7 or more and 2.3 or less, and "z" is 2.7 or more and 3.3 or less. The term "RE" in the RE123-based superconductor means that the material contains at least one of the rare-earth element and the element yttrium. The types of rare-earth element include, for example, neodymium (Nd), gadolinium (Gd), holmium (Ho), and samarium (Sm). An RE123-based superconducting wire has an advantage in that it has a higher critical-current density at the liquid nitrogen temperature (77.3 K) than that of a bismuth-based superconducting wire. In addition, it has another advantage in that it has a high critical-current value at low temperatures and in a certain magnetic field. On the other hand, in contrast to the bismuth-based superconductor, the RE123-based superconductor cannot be covered with a sheath portion. In consequence, the RE123-based superconductor is produced through a method in which a thin-film superconductor (a thin-film superconducting material) is formed on a textured-metal substrate either by the gas-phase method alone or by the liquid-phase method alone.

The stabilizing layer 11f is a layer provided for protecting the surface of the superconducting layer 11e and is composed of silver, copper, or the like. The stabilizing layer 11f may be omitted.

As shown in FIGS. 7 and 8, the superconducting wire 11 has a top surface 12, which forms the upper end 10d when the wire is wound in the shape of a racetrack, an under surface 13, which forms the lower end 10e, and side surfaces 14 and 15. The top surface 12 and the under surface 13 are ends of the width of the superconducting wire 11. The side surfaces 14 and 15 are the main surfaces of the superconducting wire as described earlier. The winding of the superconducting wire 11 assembles a multitude of top surfaces 12, forming the upper-ends-formed surface described earlier. Similarly, the assembling of a multitude of under surfaces 13 forms the lower-ends-formed surface described earlier. The superconducting wires 11 shown in FIGS. 7 and 8 may be wound such that the top surface and the under surface are reversed.

Figure 9:
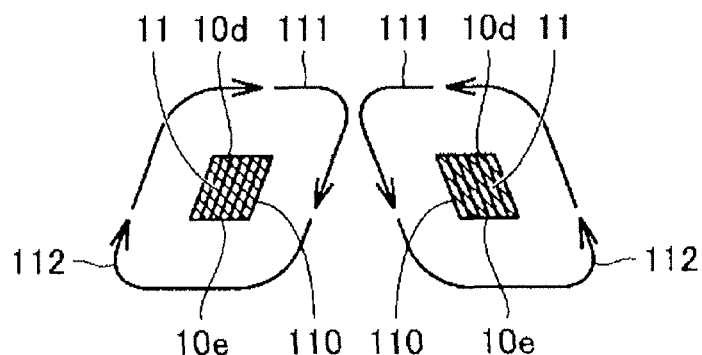
[FIG. 9]
Figure 10:
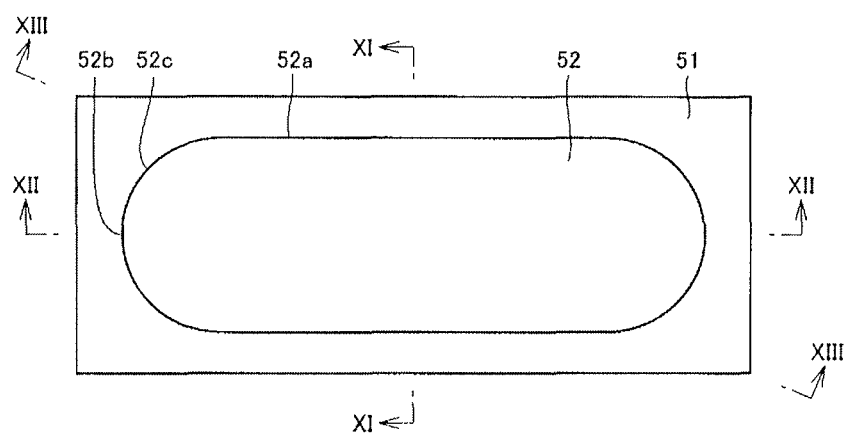
[FIG. 10]
Figure 11:
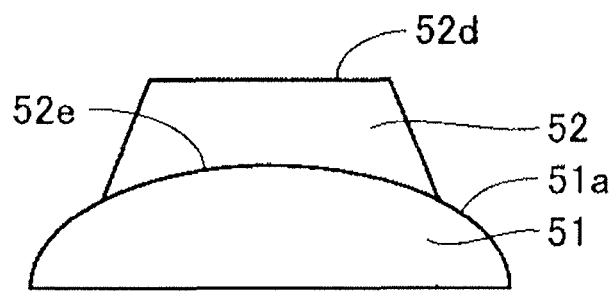
[FIG. 11]
Figure 12:
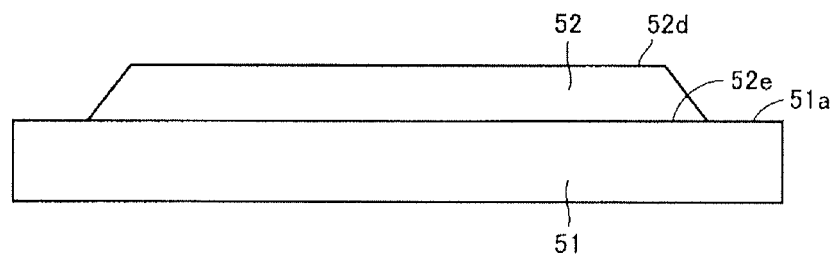
[FIG. 12]
Figure 13:
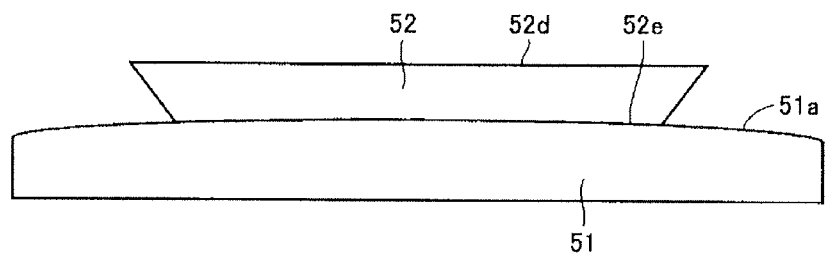
[FIG. 13]

FIG. 9 is a schematic diagram showing the condition in which lines of magnetic flux 111 and 112 are generated by the current flowing in the superconducting wire 11 in the region shown by the cross-sectional view of the linear portion 10a shown in FIG. 6's (B) portion. The lines of magnetic flux 111 and 112 shown in FIG. 9 show lines of magnetic flux circulating at a relatively inner side in comparison with the usual case as the leakage flux among lines of magnetic flux generated so as to enclose the circumference of the superconducting wire 11. As shown in FIG. 9, the lines of magnetic flux 111 and 112 generated by the superconducting wires 11 (the superconducting coil 10) each draw a path line that is slightly inclined from the lower-end-10e side to the upper-end-10d side in the case where the superconducting coil 10 is applied, for example, to the rotor or stator forming a motor. Consequently, as shown in FIG. 9, when the upper end 10d is positioned at the inner-circumference side (the side of the hollow portion formed by the enclosing superconducting coil 10) in comparison with the lower end 10e, the lines of magnetic flux 111 and 112 are each formed so as to proceed in the direction along the main surface 110 (the same as the side surface 15 in FIGS. 7 and 8) of the superconducting wire 11. The reason for this is that because the lines of magnetic flux 111 and 112 each draw a path line that is slightly inclined toward the upper-end-10d side, when the superconducting wire 11 is configured such that the distance between the upper ends 10d is smaller than the distance between the lower ends 10e, the proceeding direction of the lines of magnetic flux 111 and 112 becomes nearly in parallel with the extending direction of the main surfaces 110 of the superconducting wire 11.

When the above-described condition is achieved, the percentage of the lines of magnetic flux 111 and 112 proceeding in a direction crossing the main surfaces 110 of the superconducting wire 11 (that is, the direction along the direction of the thickness of the superconducting wire 11, that is, the direction passing through the main surfaces) is decreased. This decrease can suppress the deterioration of the current property of the superconducting wire 11 (the superconducting coil 10).

In the above-described superconducting coil 10, not only the linear portion 10a but also the curved portion 10b has a configuration in which the upper end 10d is positioned at the inner-circumference side in comparison with the lower end 10e. In consequence, as with the linear portion 10a, the curved portion 10b can suppress the deterioration of the current property caused by the lines of magnetic flux 111 and 112. As a result, the entire superconducting coil 10 can suppress more reliably the deterioration of the current property caused by the lines of magnetic flux 111 and 112.

As described above, however, the superconducting wire 11 is formed of an oxide superconductor. Consequently, as with, for example, ceramics, it is difficult to perform the processing (the winding of the superconducting coil 10) so that the entire circumference of the superconducting coil to be formed can have a configuration in which the upper end 10d is positioned at the inner-circumference side in comparison with the lower end 10e. The reason is that it is difficult to bend the superconducting wire 11 in the direction of the width of the main surface of the superconducting wire 11. When the superconducting wire 11 is subjected to the bending in the direction of the width of the main surface as described above (the edgewise bending), the oxide superconductor forming the superconducting wire 11 suffers large internal strain or stress, thereby creating the possibility of the breakage of the superconducting wire 11. Consequently, to cancel out the stress and strain produced at the inside resulting from the positioning of the upper end 10d at the inner-circumference side in comparison with the lower end 10e in the linear portion 10a and the curved portion 10b, the superconducting coil 10 is formed such that the upper end 10d is positioned at the outer-circumference side in comparison with the lower end 10e at least in a part of the region of the boundary portion 10c, as described above. This configuration controls the magnitude of the stress and strain in the entire superconducting coil 10.

Next, an explanation is given to the method of producing the superconducting coil 10 in this embodiment by referring to FIGS. 10 to 13. As shown in FIGS. 10 to 13, first, a pedestal 51 is prepared that has a curved surface.

A saddle-shaped winding frame 52 having the shape of a racetrack is placed on the curved surface 51a of the pedestal 51. The winding frame 52 has linear portions 52a, curved portions 52b, and boundary portions 52c. The boundary portions 52c are each sandwiched between the linear portion 52a and the curved portion 52b and are regions each connecting the linear portion 52a with the curved portion 52b. In the linear portion 52a and the curved portion 52b, the upper end 52d is positioned at the inner-circumference side in comparison with the lower end 52e. In the boundary portion 52c, the upper end 52d is positioned at the outer-circumference side in comparison with the lower end 52e.

The superconducting wire 11 is wound along the winding frame 52 on the curved surface 51a of the pedestal 51. The winding of the superconducting wire 11 on the curved surface 51a can form the shape of a saddle.

The performing of the above-described process can produce the superconducting coil 10 in this embodiment shown in FIG. 1's (A). The above-described production method can suppress the superconducting wire 11 from developing cracks in comparison with the case where, first, the superconducting wire 11 is wound in the shape of a racetrack and then the pressing is performed to form the shape of a saddle.

Embodiment 2

Figure 14:
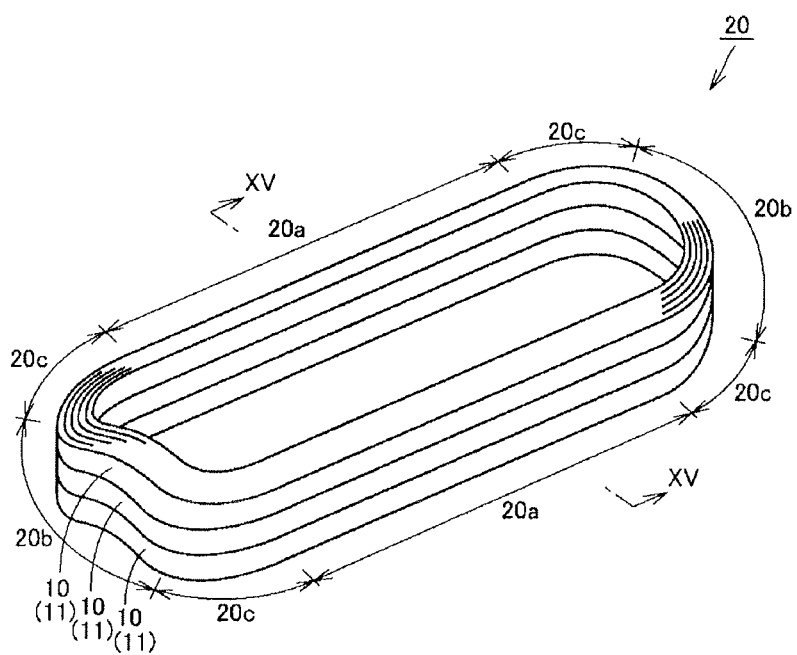
[FIG. 14]
Figure 15:
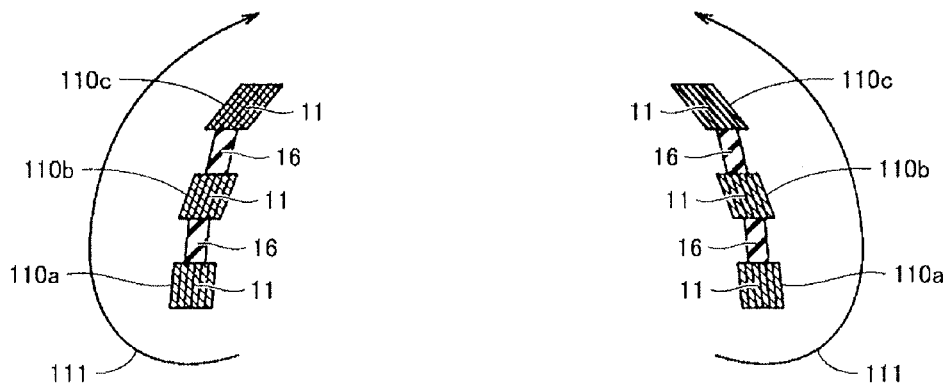
[FIG. 15]
Figure 16:
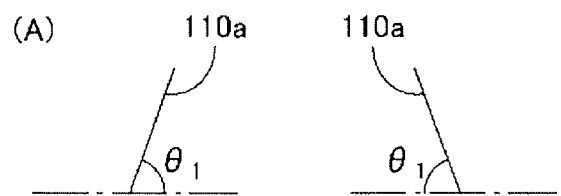
[FIG. 16] FIG. 16's (A) portion is a schematic diagram showing the angle of inclination of the main surface of the superconducting wire at the lower side in FIG. 15, FIG. 16's (B) portion is a schematic diagram showing the angle of inclination of the main surface of the superconducting wire in the middle in FIG. 15, and FIG. 16's (C) portion is a schematic diagram showing the angle of inclination of the main surface of the superconducting wire at the upper side in FIG. 15.
Figure 16:
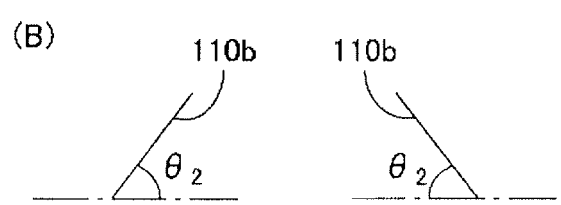
Figure 16:
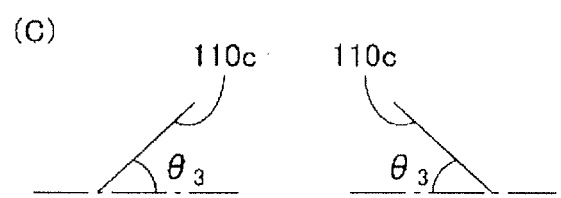

An explanation is given to the superconducting-coil assembly 20 in Embodiment 2 of the present invention by referring to FIGS. 14 to 16. As shown in FIG. 14, the superconducting-coil assembly 20 in this embodiment is formed by stacking a plurality of superconducting coils 10 in Embodiment 1 of the present invention shown in FIG. 1. More specifically, the multiple superconducting coils are stacked such that the lower end (the lower-ends-formed surface) of a superconducting coil 10 faces the upper end (the upper-ends-formed surface) of another superconducting coil 10. In FIG. 14, the linear portion 10a, the curved portion 10b, and the boundary portion 10c of the stacked individual superconducting coils 10 correspond to the linear portion 20a, the curved portion 20b, and the boundary portion 20c of the superconducting-coil assembly 20, respectively. In FIGS. 14 to 16, also, the upper side of the diagram shows the upper-end-10d side of the superconducting coil 10 (the superconducting wire 11), and the lower side of the diagram shows the lower-end-10e side of the superconducting coil 10 (the superconducting wire 11).

When the superconducting-coil assembly 20 is formed by stacking a plurality of superconducting coils 10, the magnitude of the magnetic field generated by the superconducting-coil assembly 20 is larger than that of the magnetic field generated by a single superconducting coil 10. Consequently, in the application, for example, to the stator and rotor of a motor, the use of the superconducting-coil assembly 20, which is formed by stacking a plurality of superconducting coils 10, can increase the output in comparison with the case where a single superconducting coil 10 is used. FIG. 14 shows the superconducting-coil assembly 20 formed by stacking three superconducting coils 10. The number of superconducting coils 10 to be stacked, however, is not limited to three; any number of superconducting coils 10 may be stacked.

As in the superconducting coil 10 in Embodiment 1, in each of the superconducting coils 10 forming the superconducting-coil assembly 20, at least the central portion of the linear portion and at least one part of the region in the curved portion each have a configuration in which the upper end is positioned at the inner-circumference side in comparison with the lower end. In addition, a part of the region of the boundary portion has a configuration reversed from the above-described configuration, that is, the upper end is positioned at the outer-circumference side in comparison with the lower end. Consequently, there exists a location where the position of the upper end coincides with that of the lower end in a direction crossing the circumference.

In this case, also, the magnetic field (the line of magnetic flux) generated by the current flowing in the individual superconducting coils 10 of the superconducting-coil assembly 20 draws a path line that is slightly inclined toward the upper-end side in the case where the superconducting-coil assembly 20 is applied, for example, to the rotor and stator forming a motor. More specifically, as shown in FIG. 15, the angle of the proceeding direction of the line of magnetic flux 111 with respect to the axis extending in the top-to-bottom direction in FIG. 15 (the axis is not shown in FIG. 15) is slightly larger in the upper side of the system composed of the stacked superconducting wires 11 than in the lower side.

Consequently, although the individual superconducting coils 10 forming the superconducting-coil assembly 20 may be composed of the superconducting wires 11 that are all inclined such that the individual superconducting coils 10 have the same angle toward the axis at the center of the hollow portion, it is more desirable that the angles of inclination of the main surfaces of the stacked individual superconducting coils 10 be adjusted to be different from one another.

The above description is more specifically explained below by referring to FIGS. 15 and 16. FIG. 16's (A) portion shows an angle $\theta_1$ which the main surface 110a of the superconducting wire 11 at the lower side in FIG. 15 forms with the line segment extending in the left-to-right direction in FIG. 15 (the chain single-dashed line in FIG. 16). Similarly, FIG. 16's (B) portion shows an angle $\theta_2$ which the main surface 110b of the superconducting wire 11 in the middle in FIG. 15 forms with the chain single-dashed line in FIG. 16. FIG. 16's (C) portion shows an angle $\theta_3$ which the main surface 110c of the superconducting wire 11 at the upper side in FIG. 15 forms with the chain single-dashed line in FIG. 16.

As can be seen from FIGS. 15 and 16, the main surface 110c of the superconducting coil 10 at the upper side in FIG. 15 forms a smaller angle with the axis extending in the left-to-right direction than does the main surface 110a of the superconducting coil 10 at the lower side (in other words, the main surface 110c forms a larger angle with the axis extending in the top-to-bottom direction than does the main surface 110a). When this configuration is employed, in the individual regions, the line of magnetic flux 111 generated by the current flowing in the stacked superconducting coils 10 proceeds in a direction along the main surfaces 110a, 110b, and 110c of the superconducting coils (the superconducting wires 11) facing the line of magnetic flux 111. Consequently, for the stacked individual superconducting coils 10, the percentage of the line of magnetic flux 111 proceeding in a direction crossing the main surfaces 110a, 110b, and 110c of the superconducting wires 11 (that is, the direction along the direction of the thickness of the superconducting wires 11, that is, the direction passing through the main surfaces 110a, 110b, and 110c) is decreased. This decrease can suppress the deterioration of the current property of the superconducting wires 11 (the superconducting coils 10).

In FIG. 15, there is a spacer 16 sandwiched between the stacked superconducting wires 11. The spacer 16 is made of, for example, FRP and prevents electrical short circuiting between the stacked superconducting wires 11. The spacer 16 also has a function of increasing the cooling efficiency for the superconducting wire by allowing the cooling medium, such as liquid nitrogen, for cooling the superconducting wire to flow in the region sandwiched between the superconducting wires 11.

Embodiment 3

An explanation is given to a motor 140 in an embodiment of the rotating machine of the present invention by referring to FIGS. 17 to 21. The motor 140 is provided with a rotor 130 and a stator 120, which is placed around the rotor 130.

Figure 17:
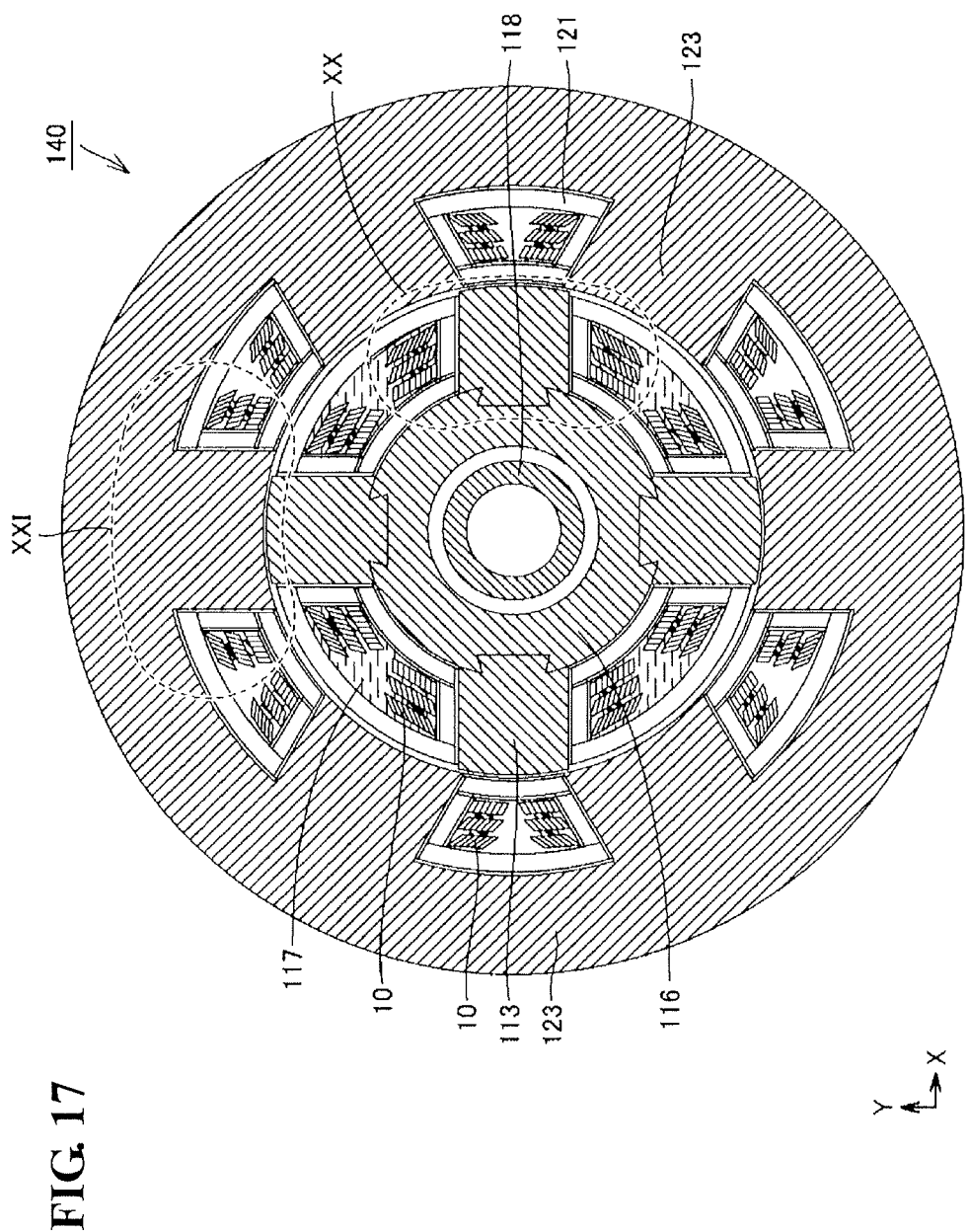
[FIG. 17]
Figure 18:
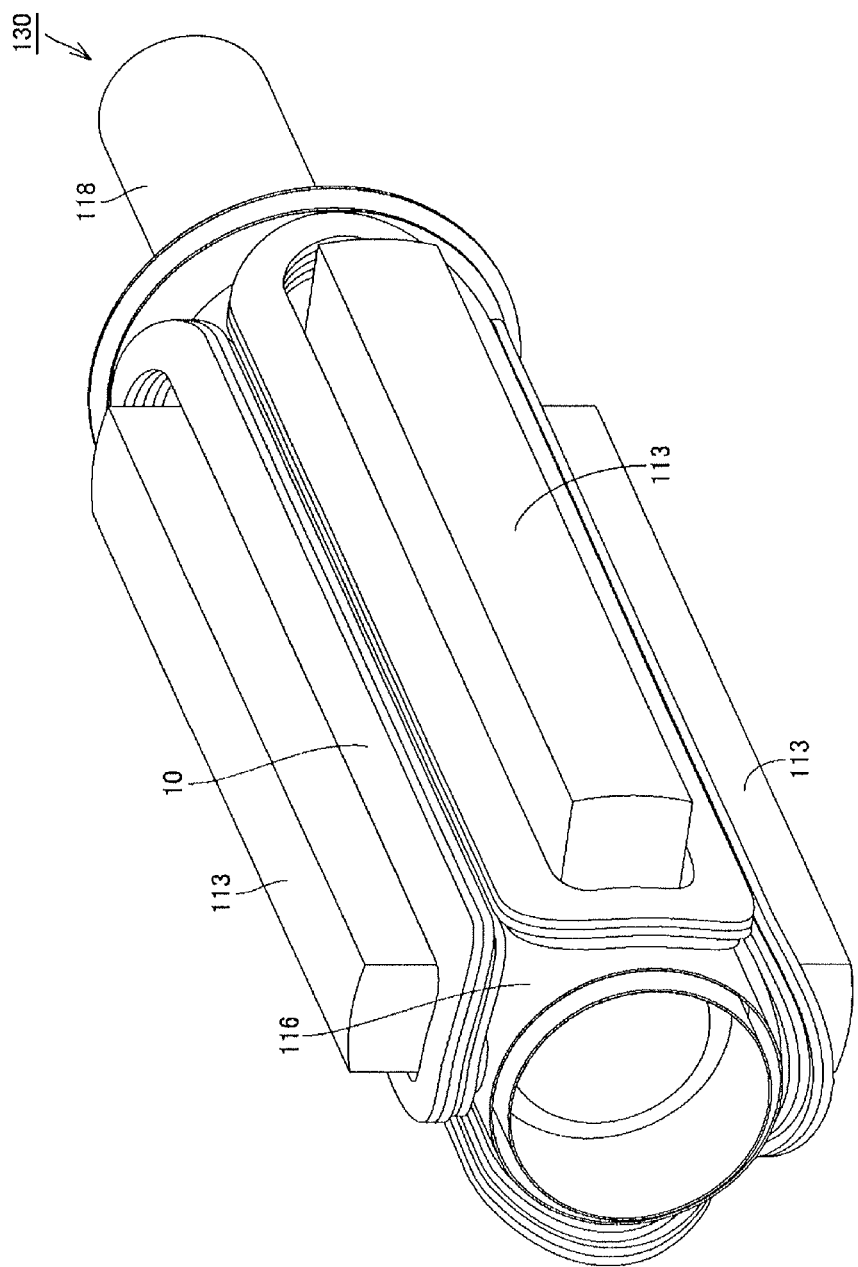
[FIG. 18]
Figure 20:
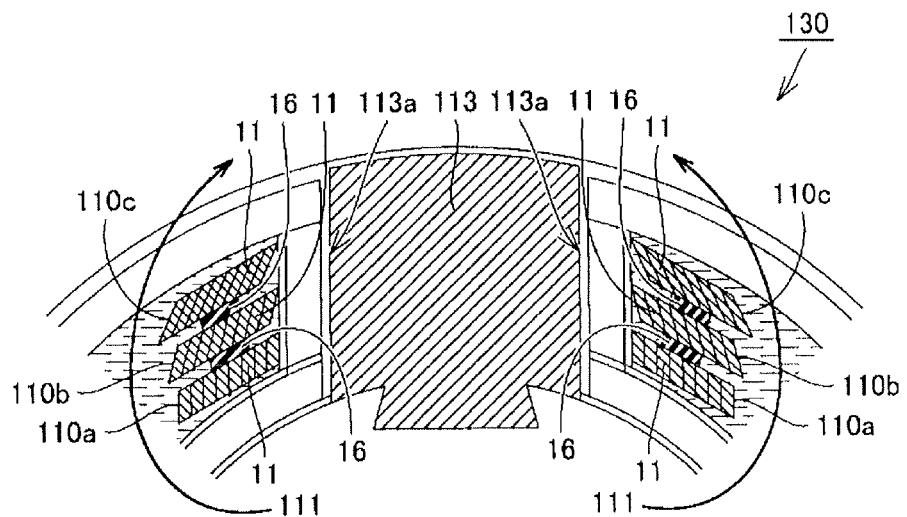
[FIG. 20]

As shown in FIGS. 17, 18, and 20, the rotor 130 has members each of which is similar to the superconducting-coil assembly 20 shown in FIG. 14, which is formed by stacking a plurality of superconducting coils 10 (each formed of the superconducting wire 11) in Embodiment 1, a rotating shaft 118, rotor cores 113, a rotor shaft 116, and a cooling medium 117. In the rotor 130, the positional relationship between the upper end and lower end of the superconducting coils 10 in the individual regions is the same as described earlier.

The rotor shaft 116 is formed around the longitudinally extending peripheral surface of the rotating shaft 118. Between the rotor cores 113, the rotor shaft 116 has an outer surface whose cross section has the shape of an arc. The rotor cores 113 each radially extend from the center portion in the cross section of the rotor shaft 116 (the center portion is the region where the rotating shaft 118 is positioned) so as to protrude from the peripheral surface of the rotor shaft 116. The superconducting coils 10 are each placed so as to surround the rotor core 113 and to be in line with the rotor shaft 116's peripheral surface, whose cross section has the shape of an arc. The cooling medium 117 cools the superconducting coils 10. The superconducting coils 10 and the cooling medium 117 are housed in a thermally insulated container.

Figure 19:
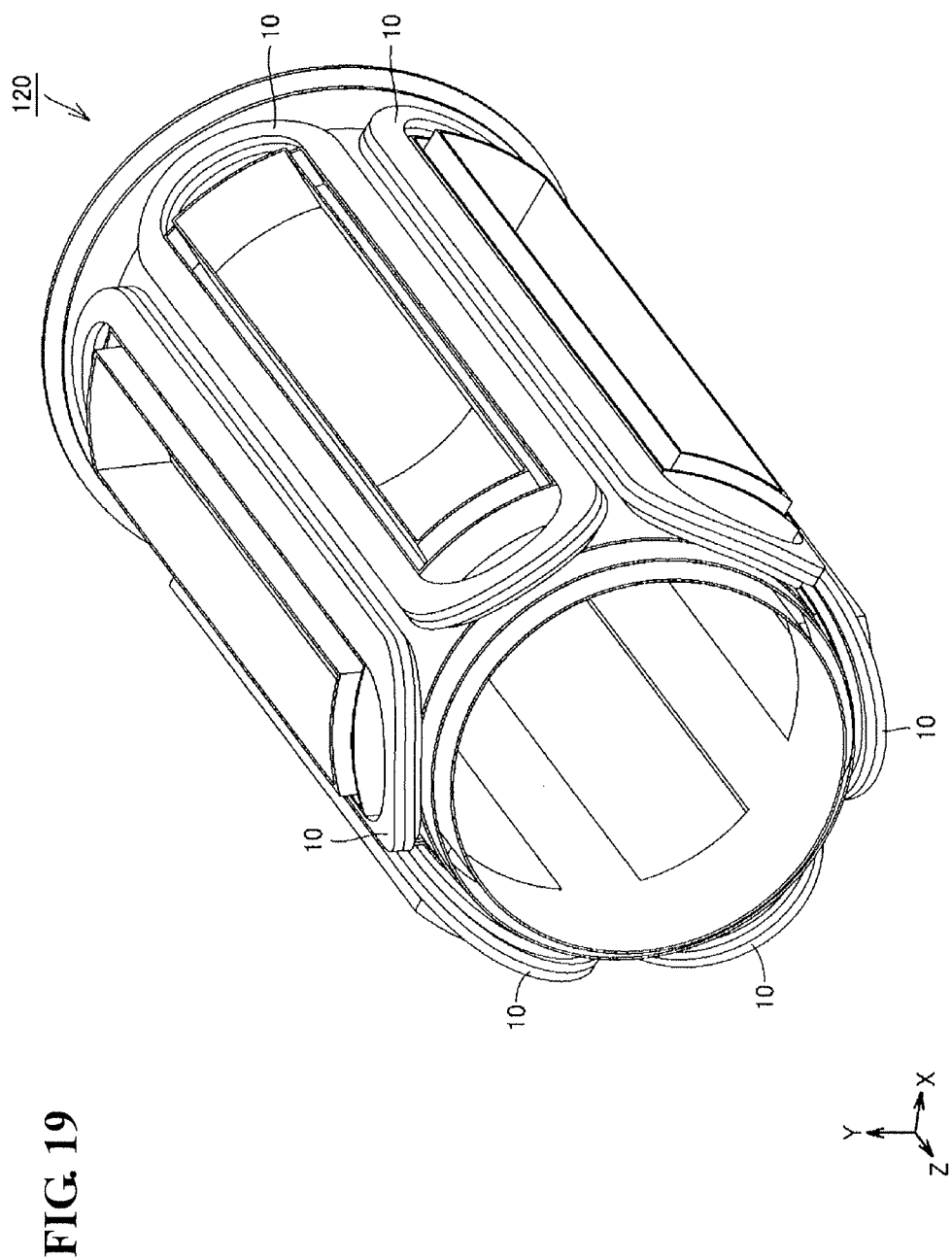
[FIG. 19]
Figure 21:
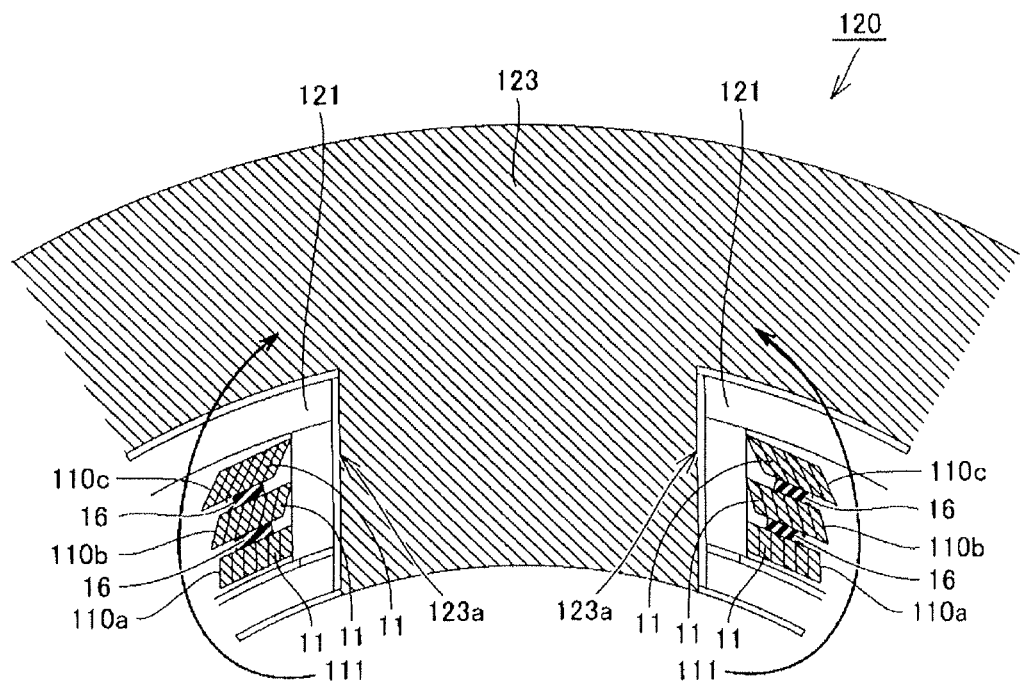
[FIG. 21]

The stator 120 of the motor 140 is positioned around the rotor 130. As shown in FIGS. 17, 19, and 21, the stator 120 has superconducting coils 10 (each formed of the superconducting wire 11) in Embodiment 1, stator yokes 121, a cooling medium, and a stator core 123. In the stator 120, the positional relationship between the upper end and lower end of the superconducting coils 10 in the individual regions is the same as described earlier.

The stator yokes 121 each lie at the outside of the periphery of the rotor core 113. The stator yokes 121 each have a peripheral surface whose cross section has the shape of an arc. The superconducting coils 10 are each positioned so as to be in line with the stator yoke 121's peripheral surface, whose cross section has the shape of an arc. The cooling medium cools the superconducting coils 10. The superconducting coils 10 and the cooling medium are housed in a thermally insulated container. The thermally insulated container has an opening at the center of each of the superconducting coils 10 so that a part of the stator core 123 can be positioned. The stator core 123 is configured so as to enclose the superconducting coils 10 and to pass through the center portion of the superconducting coils 10.

As shown in the enlarged diagram in FIG. 20, a plurality of superconducting wires 11 (superconducting coils 10) placed so as to be wound around the periphery of the rotor core 113 of the rotor 130 have main surfaces 110a, 110b, and 110c whose angles of inclination with respect to the axis extending in the left-to-right direction in FIG. 20 (or the angles of inclination with respect to the rotor core's side face 113a shown in FIG. 20) are different from one another. More specifically, as can be seen from FIGS. 15 and 16 in Embodiment 2, the main surface 110c of the superconducting coil 10 at the upper side forms a smaller angle with the axis extending in the left-to-right direction than does the main surface 110a of the superconducting coil 10 at the lower side (in other words, the main surface 110c forms a larger angle with the rotor core's side face 113a extending in the top-to-bottom direction than does the main surface 110a). Similarly, as shown in the enlarged diagram in FIG. 21, a plurality of superconducting wires 11 (superconducting coils 10) placed so as to be wound around the periphery of the stator core 123 of the stator 120 have main surfaces 110a, 110b, and 110c whose angles of inclination with respect to the axis extending in the left-to-right direction in FIG. 21 (or the angles of inclination with respect to the stator core's side face 123a shown in FIG. 21) are different from one another. As in the rotor 130, the main surface 110c of the superconducting coil 10 at the upper side forms a smaller angle with the axis extending in the left-to-right direction than does the main surface 110a of the superconducting coil 10 at the lower side (in other words, the main surface 110c forms a larger angle with the stator core's side face 123a extending in the top-to-bottom direction than does the main surface 110a).

As explained in Embodiment 2 of the present invention, the employment of the above-described configuration can suppress the line of magnetic flux 111 from passing through the superconducting coils 10 (the superconducting wires 11) in the direction along the direction of the thickness (the direction perpendicular to the main surfaces). In other words, this configuration can suppress the deterioration of the current property of the superconducting coils 10 (the superconducting wires 11). The reason for this is that as shown in FIGS. 20 and 21, the proceeding direction of the line of magnetic flux 111 generated by the current flowing in the superconducting coils 10 has a larger angle of inclination with respect to the extending direction of the rotor core's side face 113a (the stator core's side face 123a) at the upper side both in FIGS. 20 and 21 than at the lower side. In other words, the extending direction of the main surface of the superconducting coil 10 (the superconducting wire 11) placed in the individual regions is in line with the proceeding direction of the line of magnetic flux 111 facing the superconducting coil 10.

As explained above, the motor 140 as the rotating machine in Embodiment 3 is provided with the superconducting coil 10 in Embodiment 1. In other words, it incorporates a superconducting coil that can suppress the deterioration of its performance. Consequently, the performance of the motor 140 can be suppressed from deteriorating. Because the superconducting coil 10 has the shape of a saddle, the bottom side (the lower end) of the superconducting coil 10 can be placed in line with the curved surface. As a result, the motor 140 can be miniaturized.

In this embodiment, the explanation is given above to the motor 140 having the rotor 130 and the stator 120 as an example of the rotating machine. The rotating machine of the present invention, however, is not particularly limited to a motor; the present invention can also be applied to a generator, for example.

It is to be considered that the above-disclosed embodiments are illustrative and not restrictive in all respects. The scope of the present invention is shown by the scope of the appended claims, not by the above-described embodiments. Accordingly, the present invention is intended to cover all revisions and modifications included within the meaning and scope equivalent to the scope of the claims.

INDUSTRIAL APPLICABILITY

The present invention is excellent as a technique for suppressing the deterioration of the current property of a superconducting coil formed by suing a superconducting wire, a superconducting-coil assembly formed by stacking a plurality of the foregoing superconducting coils, and a rotating machine incorporating the superconducting coil.

REFERENCE SIGNS LIST

- 10: superconducting coil
- 10a, 20a, and 52a: linear portion
- 10b, 20b, and 52b: curved portion
- 10c, 20c, and 52c: boundary portion
- 10d and 52d: upper end
- 10e and 52e: lower end
- 11: superconducting wire; 11a: superconductor; 11b: sheath portion; 11c: substrate
- 11d: intermediate layer; 11e: superconducting layer; 11f: stabilizing layer
- 12: top surface
- 13: under surface
- 14 and 15: side surface
- 16: spacer
- 20: superconducting-coil assembly
- 51: pedestal; 51a: curved surface
- 52: winding frame
- 110, 110a, 110b, and 110c: main surface
- 111 and 112: line of magnetic flux
- 113: rotor core; 113a: rotor core's side face
- 116: rotor shaft
- 117: cooling medium
- 118: rotating shaft
- 120: stator
- 121: stator yoke
- 123: stator core; 123a: stator core's side face
- 130: rotor
- 140: motor

CITATION LIST

Patent Literature

Patent literature 1: the published Japanese patent application Tokukai 2002-110416.

The invention claimed is:

1. An oxide superconducting coil, having the shape of a saddle formed by winding an oxide superconducting wire in the shape of a racetrack and comprising:
   a flat oxide superconducting wire having a width that defines a transverse axis and a length that defines a longitudinal axis, wherein the wire is bent into a shape of a racetrack with the longitudinal axis encircling a fixed spatial axis a plurality of times to form a plurality of turns of the coil and with the transverse axis forming an angle with respect to the fixed spatial axis wherein the angle varies as a function of position along the length of the wire forming the coil, wherein the coil comprises:
   (a) a curved portion; and
   (b) a linear portion connected to the curved portion;
   wherein in the curved portion and in the central portion of the linear portion, a first end of the coil along the transverse axis is positioned at an inner-circumference side of the coil in comparison with a second end of the coil along the transverse axis such that the transverse axis forms an acute angle with the fixed spatial axis, and
   wherein in the curved portion, the coil's first end has a convex shape and the coil's second end has a concave shape that form the saddle shape, and
   wherein the coil's first end is one end of the width of the oxide superconducting wire, and the coil's second end is the other end of the width of the oxide superconducting wire and is positioned at the opposite side of the first end.

2. The oxide superconducting coil as defined by claim 1, wherein in a part of the region of a boundary portion sandwiched between the linear portion and the curved portion, the first end is positioned at the outer-circumference side of the coil in comparison with the second end.

3. The oxide superconducting coil as defined by claim 1, wherein the portion of the linear portion where the coil's first end is positioned at the inner-circumference side of the coil in comparison with the coil's second end comprises at least 60% of the entire length of the linear portion.

4. A rotating machine, comprising the oxide superconducting coil as defined by claim 1.

5. An oxide superconducting-coil assembly, being formed by stacking a plurality of the oxide superconducting coils as defined by claim 1.

6. The oxide superconducting-coil assembly as defined by claim 5, wherein the oxide superconducting wire in each of the oxide superconducting coils has a main surface that is inclined toward the direction in which the multiple oxide superconducting coils are stacked, with the angle of inclination being different from one oxide superconducting coil to another.

7. A rotating machine, comprising the oxide superconducting-coil assembly as defined by claim 5.

* * * * *